United States Patent [19]
Lindsey

[11] Patent Number: 5,870,606
[45] Date of Patent: Feb. 9, 1999

[54] DATA TRIGGERED TRACE TECHNIQUE FOR DEBUGGING SOFTWARE PROGRAMS

[75] Inventor: Anthony Hayden Lindsey, Fuquay Varina, N.C.

[73] Assignee: International Business Machines Corp., Armonk, N.Y.

[21] Appl. No.: 641,666

[22] Filed: May 1, 1996

[51] Int. Cl.[6] ........................................... G06F 9/44
[52] U.S. Cl. ................................ 395/704; 395/183.11
[58] Field of Search ..................... 395/701, 704, 395/183.21, 183.15, 183.14, 183.11

[56] References Cited

U.S. PATENT DOCUMENTS

| | | | |
|---|---|---|---|
| 3,707,725 | 12/1972 | Dellheim | 444/1 |
| 4,636,940 | 1/1987 | Goodwin, Jr. | 364/200 |
| 4,819,234 | 4/1989 | Huber | 371/19 |
| 5,355,487 | 10/1994 | Keller et al. | 395/650 |
| 5,361,352 | 11/1994 | Iwasawa et al. | 395/700 |

OTHER PUBLICATIONS

Moher, T., "PROVIDE: A Process Visualization and Debugging Environment", IEEE Transactions of Software Engineering, vol. 14, No. 6, Jun. 1988, pp. 849–857, Jun. 1988.

Graham et al, "gprof: a Call Graph Execution Profiler", ACM, May, 1982.

*Primary Examiner*—James P. Trammell
*Assistant Examiner*—Kakali Chaki
*Attorney, Agent, or Firm*—Gregory M. Doudnikoff

[57] ABSTRACT

A technique for permitting tracepoints to be set relative to data elements for the debugging of a procedural program is disclosed. A proxy object is provided for each data element relative to which tracing is desired. The proxy object intercepts messages sent from the program to the data element caused by the execution of logic statements. In accordance with a developer's specified parameters, tracing functions relative to the data element are invoked in response to the receipt of each message dependent upon the nature of the message. The proxy object then forwards the message to the intended data element. Subsequent return of control from the data element to the program may also invoke the proxy object and affect tracing in accordance with parameters supplied by the developer to the debugger.

11 Claims, 6 Drawing Sheets

DATA TRIGGERED TRACE TECHNIQUE FOR DEBUGGING SOFTWARE PROGRAMS

BACKGROUND OF THE INVENTION

1. Field of the Invention

The present invention relates to an improved tool for debugging software applications. More particularly, the present invention relates to an improved tracing function for use in debugging software programs.

2. Description of the Related Art

One critical but often overlooked part of the process of developing software programs is the elimination of errors from the software program. The process of eliminating errors is known as debugging. After one or more software developers writes the code for a software program, the program must be tested to determine what errors exist in the program, and then the program must be debugged to reduce or eliminate the errors. For commercial software, it is imperative that most of the errors or bugs are found and debugged prior to the software being released to the marketplace. The debugging process can be quite extensive, costly and time consuming. Accordingly, software tools and techniques have been developed to assist in the debugging of code and reduce the debugging cycle time.

Additionally, for errors or bugs found in commercial software following the release of the commercial software, software manufacturers must be able to respond rapidly to customer complaints about bugs, and provide fixes in short order.

The software errors or bugs can be categorized into two types. The first type is a logic error, in which logic statements or commands included by the software developer in the program are flawed, such that the desired function is not performed during execution of the program, or is not performed properly, etc. Typically, logic errors cause the program to execute functions or commands within the program which are not desired by the developer. The second type of error is with regard to data being maintained or used by the program, and occurs when the data is somehow corrupted.

A number of debugging functions and techniques are presently employed in currently available software used to debug programs. One set of known techniques are known as testpoints, and include the setting of breakpoints, tracepoints, watchpoints, etc. However, the use of tracepoints has been rather limited. While tools exist which set tracepoints so as to trigger creation of trace information upon the execution of a specific logic unit in a program being debugged, no similar mechanism exists for setting tracepoints so as to trigger tracing relative to specific data components within or utilized by a program. The existing logic-based trace function can create information regarding data movement, but only in the context of data movement that occurs upon execution of a logic unit. Further, information is created relative to all data components. When information is being sought relative to a single component, the logic-based tracepoint procedure is costly in terms of processing time, since information relative to all affected data components is gathered, and in terms of developer time, as the developer must sort through information relevant to all affected data components to find information pertaining to the desired one. The ability to trigger the generation of trace data based upon a specific data component so that information can be obtained relative to the data component during execution of logic units would be a valuable tool for developers in the debugging of programs.

U.S. Pat. No. 5,093,914, which issued to Coplien et al., discloses a method for using breakpoints in the debugging of programs written in an object oriented language. This patent is of interest in that it does address using breakpoints (a form of testpoints which causes a program to halt executing when encountered) in the debugging of object oriented programs. However, the Coplien patent does not address tracepoints, and does not address the problem of or provide a solution for the lack of a trace function relative to data components in the debugging of programs.

IBM's Cross System Product (CSP), Version 4.1, which was released in 1992, provides an object oriented solution for the debugging of procedural programs. However, while that solution does provide debugging with testpoints, it does not enable the setting of tracepoints relative to data components in a program.

A need still exists for a debugging tool which permits a developer to gather trace information specific to designated data components for a program undergoing debugging.

SUMMARY OF THE INVENTION

Accordingly, an object of the present invention is to provide a technique for debugging code by utilizing a tracepoint which triggers tracing based on an access of or modification to a specific data component related to the code.

Another object of the invention is to provide a tracepoint-based debugging technique for data components which requires minimum processor overhead.

Other objects and advantages of the present invention will be set forth in part in the description and the drawings which follow, and, in part, will be obvious from the description, or may be learned by practice of the invention.

To achieve the foregoing objects, and in accordance with the purpose of the invention as broadly described herein, the present invention provides computer readable code for triggering the creation of trace data based on access to a data element associated with a computer program, comprising first subprocesses for designating a data element relative to which trace data is desired; and second subprocesses for initiating collection of trace data upon an attempt to access the designated data element. The first subprocesses may further designate an event upon which the collecting of trace data will cease, and the computer readable code may further comprise third subprocesses for causing the collection of trace data to cease upon occurrence of the designated event. The code may further comprise fourth subprocesses for designating a type of access for triggering the creation of trace data, wherein the second subprocesses initiate collection of trace data when an attempt to access the designated data element is the designated type of access. The code may further comprise fifth subprocesses for modifying the collection of trace data after the access of the data element occurs.

Additionally, the present invention provides, in a computing environment, a system for collecting trace data based on accessing a data element associated with a computer program, comprising means for designating at least one data element relative to which collecting of trace data is desired; means for designating tracing parameters; and means for collecting trace data in accordance with the designated tracing parameters prior to an access of the designated data element or after the access of the designated data element is complete.

The present invention will now be described with reference to the following drawings, in which like reference numbers denote the same element throughout.

DESCRIPTION OF THE PREFERRED EMBODIMENT

Figure 1:
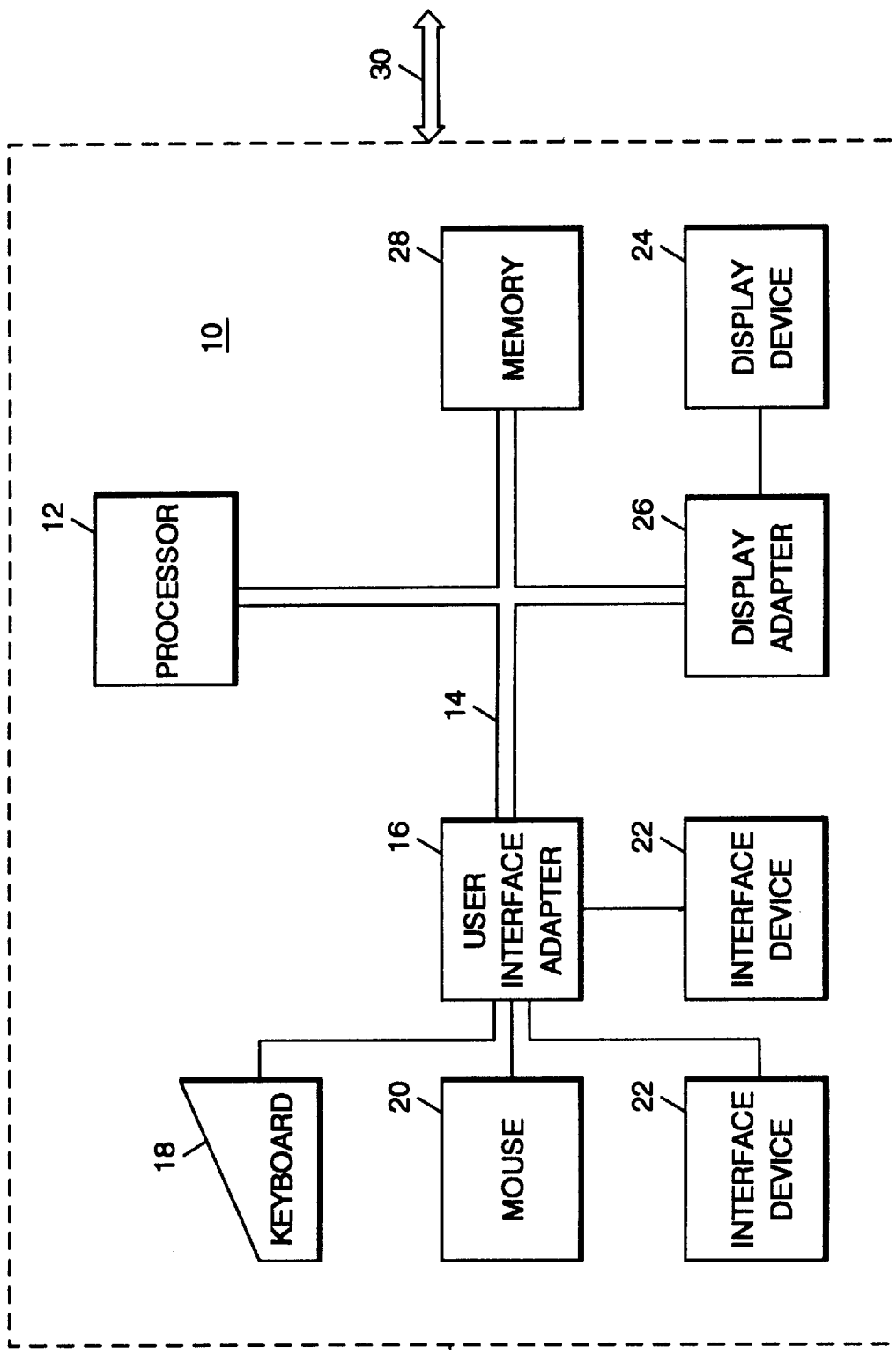
FIG. 1 is a block diagram of a representative hardware environment in which the present invention may be practiced.

The present invention may be implemented in any of a variety of programming languages, such as Smalltalk, C++, C, etc. FIG. 1 illustrates a representative hardware environment in which the present invention may be practiced. The environment of FIG. 1 comprises a representative conventional single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, a mouse 20, and/or other interface devices 22, which can be any user interface device, such as a touch sensitive screen, digitized pen entry pad, etc. The bus 12 also connects a display device 24, such as an LCD screen or monitor, to the microprocessor 12 via a display adapter 26. The bus 14 also connects the microprocessor 12 to memory 28, which can include ROM, RAM, etc. The workstation 10 communicates via a communications channel 30 with other computers. The workstation 10 may be associated with such other computers in a local area network or a wide area network, can be a client in a client/server arrangement with another computer, etc. All of these configurations, as well as the appropriate communications hardware and software, are known in the art.

Software programming code which implements the present invention is typically stored in the memory 28 of the standalone workstation 10. In a client/server environment, the software program code may be stored with memory associated with the server. The software program code may be embodied on any of a variety of known media for use with a data processing system, such as a diskette or CD-ROM. The code may be distributed on such media, or may be distributed to users from the memory of one computer system over a network of some type to other computer systems for use by users of such other systems. Such techniques and methods for embodying software program code on physical media or distributing software code via networks are well known and will not be further discussed herein.

The preferred embodiment of the present invention will now be described with respect to FIGS. 2–6. In the preferred embodiment, the present invention is implemented in an object oriented language, such as Smalltalk. Object oriented languages are fundamentally different than procedural languages, and execution of object oriented programs is carried out by the sending of messages which trigger methods within individual instances of objects to executed, which in turn cause more messages to be sent and more methods to be executed. Features of object oriented programming are well known and will not be further discussed herein. It is not necessary for a debugging tool, which incorporates the present invention, to be written or implemented in an object oriented language, although certain capabilities of the present invention may be more easily implemented in an object oriented language due to the features of object oriented languages.

This invention permits setting of tracepoints for data items for programs written in procedural languages. Commonly assigned and copending patent application Ser. No. 08/640,613, entitled "Data Triggered Trace Support for Debugging Object Oriented Programs", having the same inventor and filed on even date herewith, describes a technique whereby tracepoints can be set relative to data components in the debugging of object oriented programs.

A logic unit is any of a collection of one or more logic statements defined within the source language for the program being debugged. A single statement constitutes a collection, so a logic unit may comprise a single statement, or groups of statements that are named within the source language, or an entire application or program. A data element is any collection of named entities within the source language that represents a mechanism for addressing program storage that is accessible by the program being debugged. A single entity constitutes a collection, thus a data element may include individual fields, higher level composite fields, file or database records, or user interface structures. As discussed, a tracepoint is a type of testpoint which is a specialized debugging trigger that directs the debugging tool to alter its global trace state. Heretofore, tracepoints have only been available for use in association with logic units. Relative to a logic unit, a tracepoint affects the debugger's trace state upon entry into the associated logic unit or exit from the associated logic unit. During execution of a program during debugging, when a logic unit is entered for which a tracepoint is set, the entry can either turn the trace function of the debugger on or turn the trace function of the debugger off. Similarly, exiting from the logic unit can turn the trace on, turn the trace off, or return the trace state to its prior value when the entry into the logic unit occurred.

When the trace function is triggered, the debugger collects trace information regarding what is occurring while the program being debugged is executing. This information is then made available to the developer for use in attempting to debug the program. The specifics of what occurs in a debugger when a trace function is executed is not necessary to understand the present invention, and will not be described in detail herein, and is already known in the art.

Figure 2:
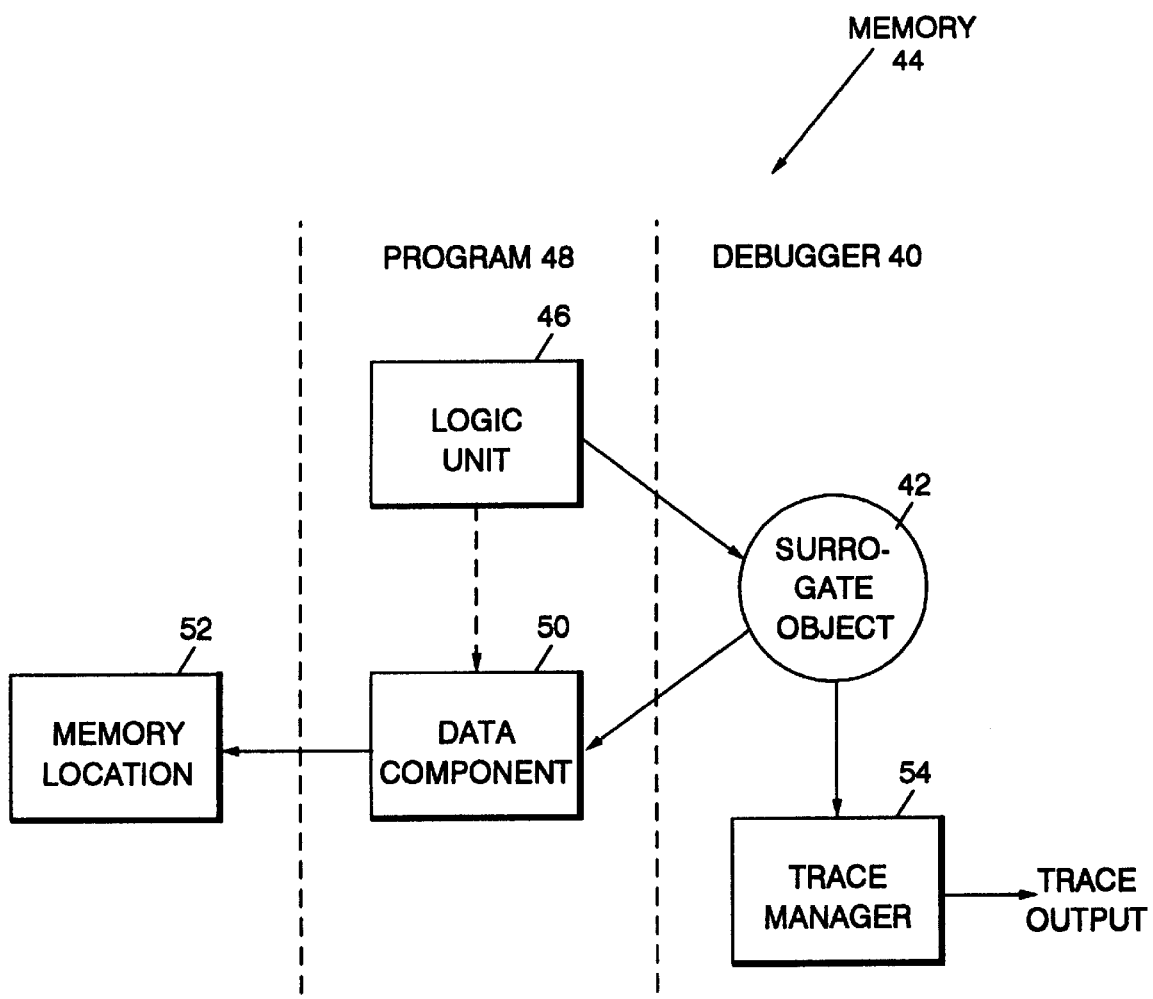
FIG. 2 is a diagram which illustrates relevant architectural aspects of the present invention.

The architecture and general logic flow for the present invention is illustrated in FIG. 2. It should be understood that during execution of a program, the program will send messages to associated data components in memory in accordance with its logic. Typically, these messages will either be attempts to read the value contained in the data component, or write a value to the data component. This flow of messages is illustrated by the dashed line in FIG. 2. The present invention provides a debugging component 40 which provides a surrogate object 42 (both of which reside in memory 44), which intercepts all messages being sent due to execution of each logic unit 46 in a program 48 to a data component 50 associated with the program 48. The data component 50 may be the named representation within the program 48 which accesses an actual memory location 52 for the data. All of these items are logically located within memory 44. If appropriate, the surrogate object 42 causes a trace manager 54 of the debugger 40 to begin the trace function and collect data describing conditions in the program 48 and data items associated with the memory 44 in accordance with set parameters. The trace manager 54 outputs the trace information at a time and in a manner in accordance with known techniques.

Figure 3:
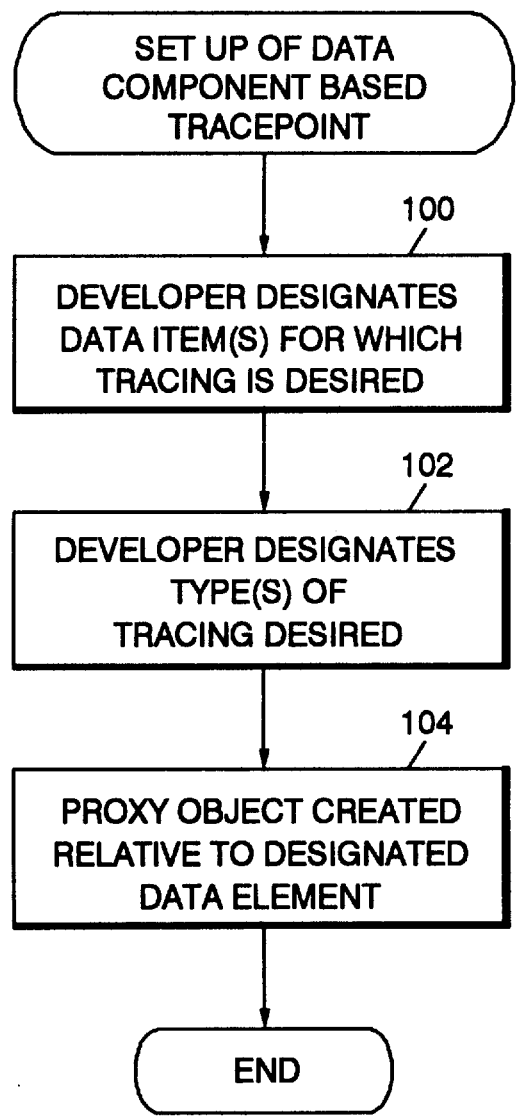
FIG. 3 is a flowchart illustrating the logical steps associated with setting a tracepoint for a data component in accordance with the present inventions.
Figure 4:
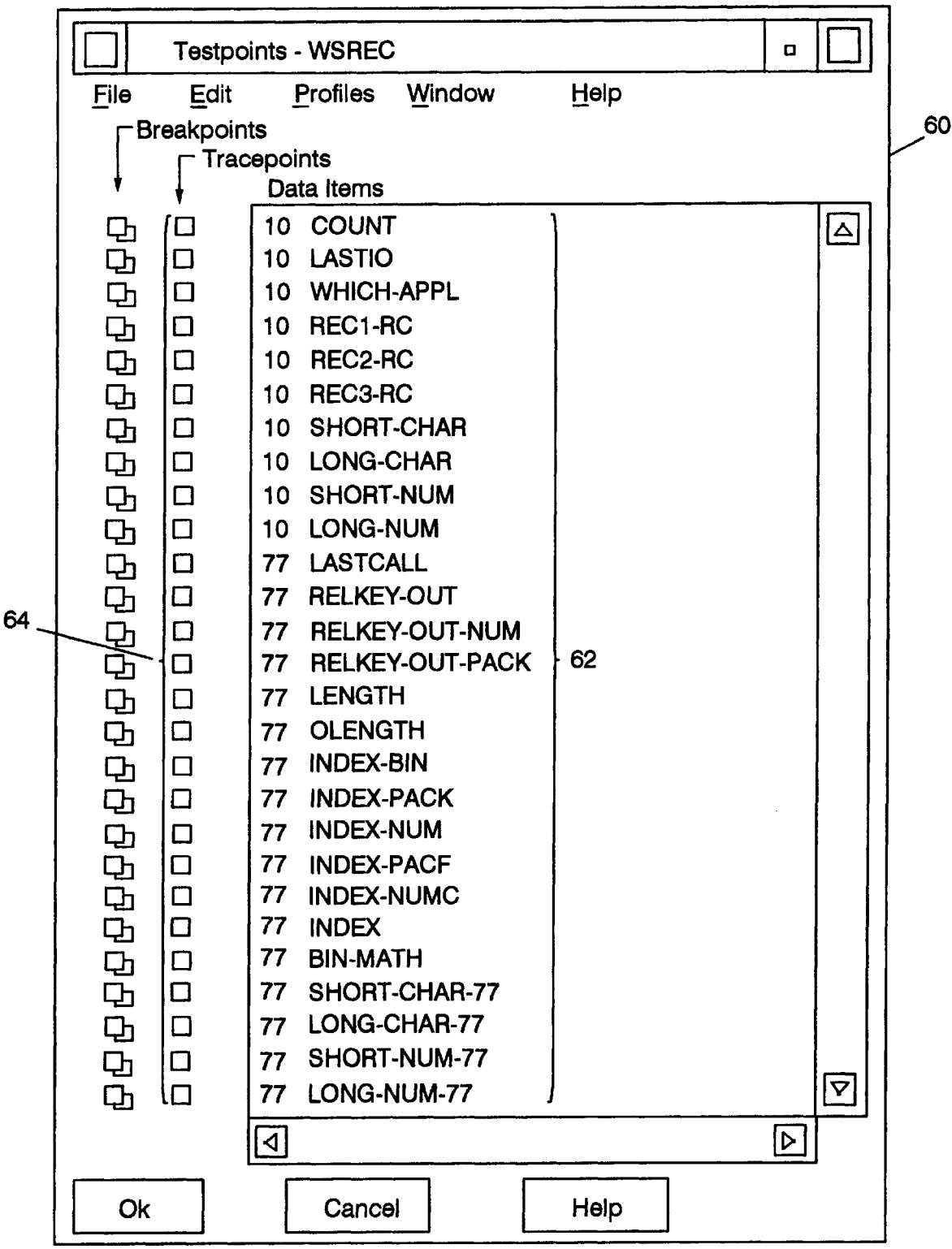
FIG. 4 illustrates a window which may be used in a debugging program or routine through which a developer may set tracepoints for data components for a program being debugged.

The logic involved with setting up a trace point for a data component in accordance with the preferred embodiment will now be described with reference to the flowchart of FIG. 3, although it should be understood that this technique is not the only way to set a tracepoint relative to a data item. The debugger permits the developer to designate one or more data elements for which tracing is desired (Step 100). FIG. 4 illustrates a window 60 displayed within a user interface of a software tool which provides a dialog by which a developer may set tracepoints for specific data items associated with the program being debugged. A scrollable list of data elements 62 is provided in the window 60. A number of selectable boxes 64, one logically associated with each data item in the list 62, is also provided in the window 60. The developer sets a tracepoint relative to a given data item by selecting the box 64 associated with the data item.

Figure 5:
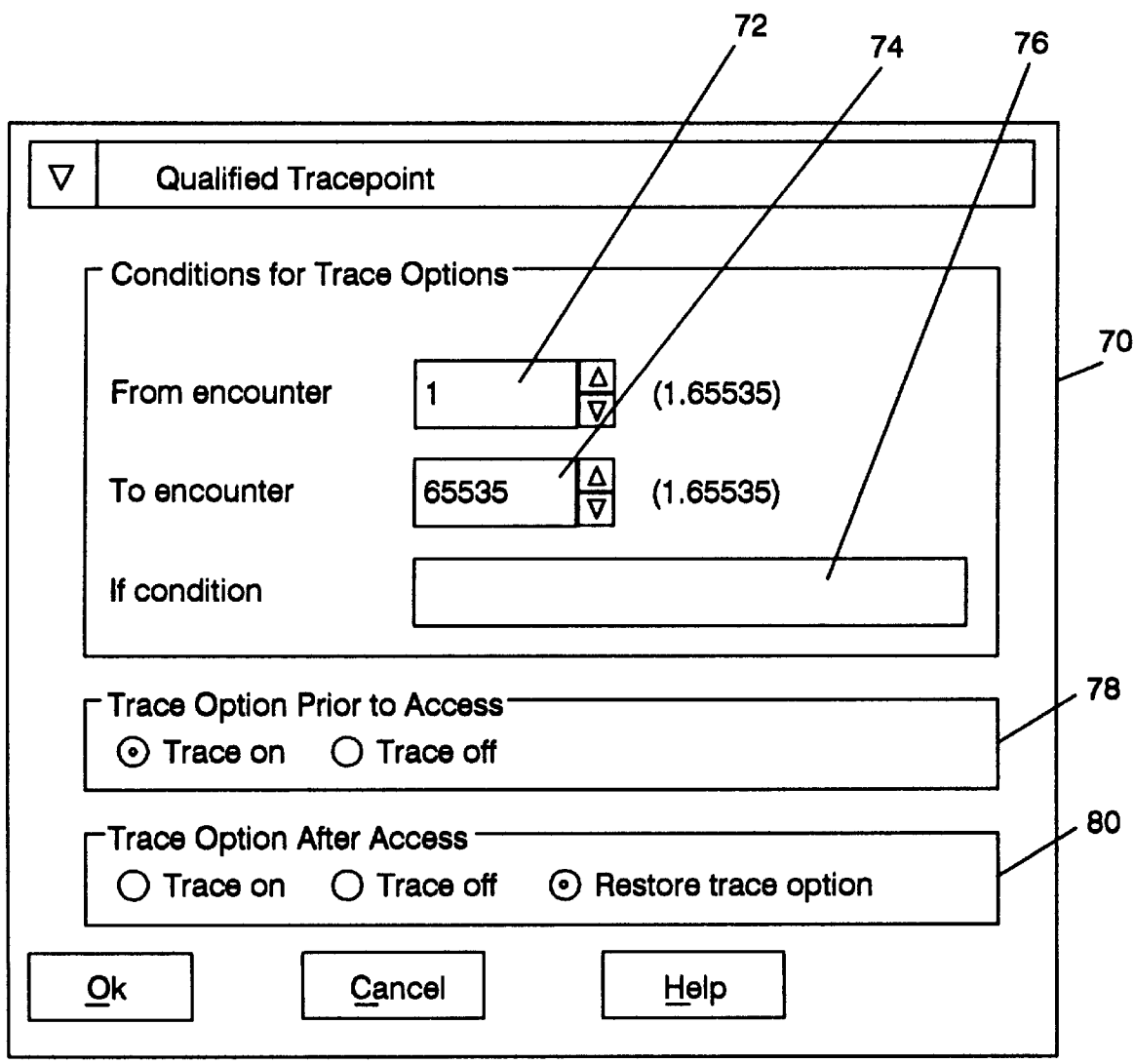
FIG. 5 illustrates a window which permits a developer to input specific tracepoint function parameters.

FIG. 5 illustrates a window 70 which may be displayed in a user interface of the software tool which provides the developer with options available for the tracing being set relative to the given data item. For example, the developer can specify which access of the data item (i.e., first, tenth, eightieth) during execution of the program will cause the trace to be turned on and then off by setting a range in boxes 72, 74. It should be understood that the term access in the disclosure means an attempt to read the value in the data element or an attempt to write or modify a value contained in the data element. The developer can also identify a condition under which the trace is to be initiated by setting an appropriate condition in box 76, and can specify whether the trace function is to be turned on or off prior to the data element being accessed in box 78 or whether the data option is to be turned on, turned off, or restored after the data item is accessed (upon a return of control by the message) by manipulating the option provided in box 80.

Referring once again to FIG. 3, after the developer designates one or more data items for which tracing is desired, the developer designates specific functional parameters for the trace function in Step 102 via the window 70 of FIG. 5, relative to each designated data item. The debugger then creates the appropriate proxy or surrogate object 42 relative to each designated data item 50 (Step 104) and replaces all references within the program 48 with references to the proxy object 42. The proxy object 42 is created including a reference to the designated data element 50 so that received messages can be forwarded. The purpose of the proxy object 42 is to control tracing based on accesses to the designated data item 50, in accordance with the input trace function parameters, which are incorporated into the proxy object 42 upon its creation. Although in the preferred embodiment the trace function parameters are stored as state or data within the data portion of the proxy object 42, the parameters could be implemented within the proxy object 42 as a method.

The proxy object 42 is logically positioned so as to intercept all attempts to access the designated data element 50 by the logic units 46 within the program 48. For example, in Smalltalk, the present invention could be implemented by executing none of the data element methods. However, the "#doesNotUnderstand" message would be implemented. This would allow the proxy object 42 to intercept all messages intended for the designated data element 50, and initiate trace changes as appropriate. Methods within the proxy object 42 then cause the developer input parameters for tracing relative to the data element 50 (which are stored within the data portion of the proxy object 42) to be implemented. For example, if a trace is to be nonqualified and implemented no matter whether the attempt to access the data item is simply to read the data item or to write to the data item, a method and data in the proxy object 42 will cause the trace manager 54 to begin tracing, while another method and data associated with the surrogate object 42 will cause the original message from the program 48 to be sent to the data component 50. Steps 100–104 may be carried out serially for each data item upon designation, or may be performed in parallel, with multiple data items being designated, and then parameters being defined, etc.

Figure 6:
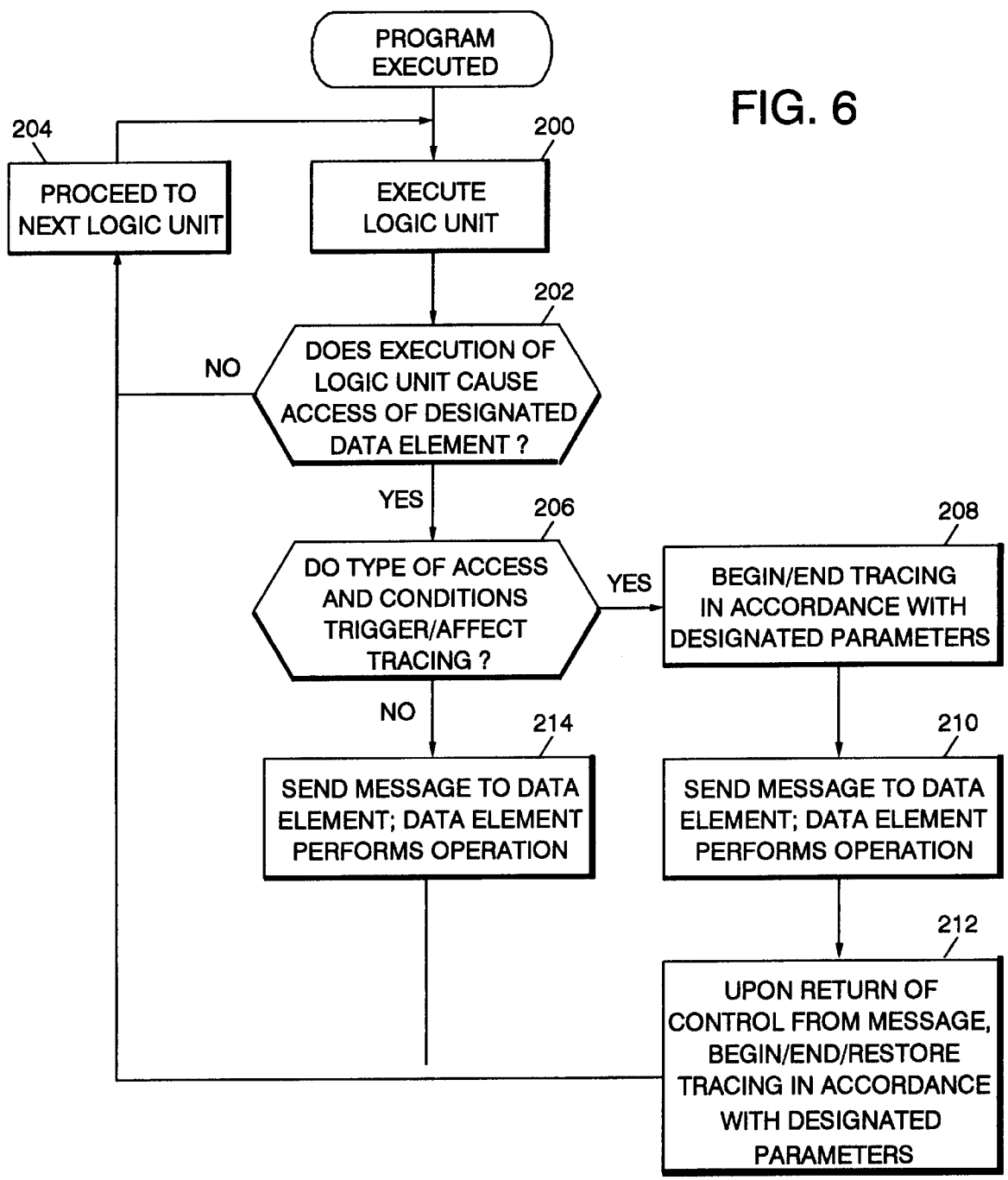
FIG. 6 is a flowchart illustrating the logical steps for triggering a trace function based on a data component being accessed in accordance with the present invention.

The logic associated with the execution of the program 48 and debugging tool 40 during debugging will now be described in detail with reference to FIG. 6. During debugging, the logic statements within the application or program being debugged are executed. As each logic unit is executed (Step 200), a message of some type either will or will not be sent to the data component 50. The surrogate object 42 simply waits for a message to be sent from the logic statement being executed to the surrogate object 42. Prior to creation of the surrogate object 42, the message would have been sent directly to the data element 50. Unless a message is sent to the surrogate object 42 of the data element 50, no processing occurs relative to the proxy object 42, and no tracing commences relative to the data element 50. Thus, minimal processor overhead is associated with this technique, as processor time is only utilized in the event that the designated data component 50 is addressed due to execution of a logic statement. Accordingly, unless a message is received by the surrogate object 42 associated with the data component 50 in Step 202, no tracing will be initiated and there will be no processor overhead. The processing of the program 48 being debugged will not be interrupted and the next logic unit within the program is executed (Steps 204, 200).

If the proxy object 42 receives a message from the program 48 due to execution of the logic unit in Step 200, then processing proceeds from Step 202 to Step 206, and the surrogate object 42 is essentially activated. Depending on the type of message being sent to the data component 50 and/or the conditions set by the developer for affecting tracing, a method within the surrogate object 42 may cause a trace message to be sent to the trace manager 54. For example, an attempt to read the value in the data element 50 might not trigger tracing, but an attempt to write a value to the data element 50 could. If it is determined in Step 206 that the access begins tracing or otherwise has an effect on tracing, the method sends an appropriate trace message to the trace manager 54. Upon receipt of the trace message from the surrogate object 42, the trace manager 54 begins tracing or otherwise affects tracing (e.g., ends tracing) in accordance with the designated parameters (Step 208). The surrogate object 42 also forwards the message it received from the program 48 to the corresponding data element 50 (Step 210). The data element 50 then performs as required by the message, and control is returned by the data element 50 (access to the data element 50 has been completed).

After access, the surrogate object 42 once again becomes active. The methods and data of the surrogate object 42 once again may cause a number of things to happen in accordance with the parameters set by the developer (Step 212). For example, the return of control from the data component 50 may cause tracing to end. In this case, the surrogate object 42 sends an appropriate trace message to the trace manager 54, and the trace manager 54 causes the tracing function to terminate. The gathered information can then be provided to the developer in accordance with known techniques.

Alternatively, return of control from the data component 50 may cause tracing to begin, or permit additional or modified tracing to be carried out, in accordance with the developer's specified parameters. In both cases, an appropriate trace message is sent by the proxy object 42 to the trace manager 54, which implements the appropriate action.

Alternatively, the return of control might have no impact on tracing. In this instance, the proxy object 42 simply sends no trace message to the trace manager 54.

In any case, following the appropriate action or inaction by the proxy object 42, processing within the program 48 proceeds to the next logic unit for execution (Steps 204, 200).

If it is determined in Step 206 that the message from the program 48 has no effect on tracing, the proxy object 42 simply forwards the message to the data element 50 (Step 214). The data element 50 then performs the requested operation, and processing proceeds without interruption to the next logic unit (Steps 204, 200).

In certain instances, the data component 50 may be a type of memory which is comprised of overlapping fields. In this situation, the above described technique may have to be modified slightly in certain situations in order to perform effectively. In one alternative, a surrogate object of the nature described above would not be employed, but rather all accesses or modifications to the memory structure that contains the overlapping fields must be considered to determine if the memory region of interest has been accessed or modified. The surrogate object must be logically placed around the actual memory location to intercept messages from the program, rather than being placed in between the program and the named data component that points to the memory location.

For example, in a range of 60 bytes of memory which stores a customer "address", two designated bytes within the range may include information regarding the "state" in which the customer is located. A developer may desire that an access to the two bytes associated with the "state" initiate tracing. However, the two bytes may be accessed when the program accesses either "state" or "address", but will not be accessed when the program accesses "street" within the "address" range. Accordingly, when the "address" or any part thereof is accessed, the logic of the enveloping object causes the entire "address" range to be compared against the portion of that range for the "state". Since the "state" portion overlaps the overall "address", such an access would trigger tracing. On the other hand, if only the "street" portion of the "address" range is accessed, a comparison made between the "street" portion of the "address" range and the "state" portion of the "address" range would not initiate tracing, since no overlap exists.

Alternatively, such a situation could be addressed by creating a surrogate object for both the sub-field and for all overlapping fields. In the situation described above, one surrogate object would be created for address, and another surrogate object would be created for state. An access to either could then initiate tracing. However, an access to the street portion of the address would not initiate tracing.

The skills required to implement the subject invention are well within the skills of those having ordinary skill in the art. While one embodiment of the invention has been described, it will be appreciated by those skilled in the art that various modifications and variations are possible without departing from the spirit and scope of the invention.

I claim:

1. Computer readable code stored on media for triggering the creation of trace data based on access to a data element associated with a computer program, comprising:

first subprocesses for designating a data element relative to which trace data is desired; and second subprocesses for initiating collection of trace data upon an attempt to access the designated data element.

2. Computer readable code stored on media for triggering the creation of trace data according to claim 1, wherein said first subprocesses further designate an event upon which the collection of trace data will cease, said computer readable code further comprising third subprocesses for causing the collection of trace data to cease upon occurrence of the designated event.

3. Computer readable code stored on media for triggering the creation of trace data according to claim 1, further comprising fourth subprocesses for designating a type of access for triggering the collection of trace data, wherein said second subprocesses initiate the collection of trace data when an attempt to access the designated data element is the designated type of access.

4. Computer readable code stored on media for triggering the creation of trace data according to claim 1, further comprising fifth subprocesses for modifying the collection of trace data after the access of the data element.

5. In a computing environment, a system for collecting trace data based on accessing a data element associated with a computer program, comprising:

means for designating at least one data element relative to which collecting of trace data is desired;

means for designating tracing parameters; and means for collecting trace data in accordance with the designated tracing parameters upon an attempt to access the designated data element or after accessing the designated data element.

6. A system for collecting trace data according to claim 5, further comprising means for ending collection of trace data based upon occurrence of an event designated in the tracing parameters.

7. A system for collecting trace data according to claim 5, wherein said designating means further comprises creating a proxy object corresponding to the designated data element and modifying the computer program to send all messages intended for the designated data element to the proxy object, the proxy object being programmed to forward messages it receives to the corresponding designated data element.

8. Computer readable code stored on media for triggering the creation of trace data according to claim 1, wherein said first subprocesses further comprises creating a proxy object for the designated data element and modifying the computer program so that messages intended for the data element are sent to the proxy object, and wherein said second subprocesses further comprises initiating collection of trace data when a message intended for the designated data element is received by the proxy object.

9. Computer readable code stored on media for triggering the creation of trace data according to claim 8, wherein the proxy object forwards all messages it receives which are intended for the designated data element to the designated data element.

10. A method for collecting trace data based upon access of a data element in a computer program, comprising the steps of:

designating a data element relative to which collection of trace data is desired;

creating a proxy object to receive all access attempts of the designated data element;

modifying the computer program to send all attempts to access the designated data element to the proxy object; and initiating collection of trace data upon an attempt to access the designated data element.

11. A method for collecting trace data according to claim 10, further comprising the step of designating tracing parameters, wherein said initiating step initiates collection of trace data when the designated tracing parameters are met.

* * * * *